United States Patent
Lemberger et al.

(10) Patent No.: US 6,273,840 B1
(45) Date of Patent: Aug. 14, 2001

(54) METHOD FOR SHUTTING DOWN AND SWITCHING ON MOTOR VEHICLE INTERNAL-COMBUSTION ENGINE CYLINDERS

(75) Inventors: Heinz Lemberger, Unrerfoehring; Josef Bauer, Isen, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/512,058

(22) Filed: Feb. 24, 2000

(30) Foreign Application Priority Data

Feb. 24, 1999 (DE) .............................. 199 07 851

(51) Int. Cl.⁷ .................................................. B60K 41/20
(52) U.S. Cl. ........................ 477/185; 477/199; 477/200
(58) Field of Search .................................. 477/182, 185, 477/186, 199, 200, 208

(56) References Cited

U.S. PATENT DOCUMENTS

| | | | |
|---|---|---|---|
| 4,187,824 | * 2/1980 | Connolly | 423/198 F |
| 4,227,505 | * 10/1980 | Larson et al. | 477/111 |
| 4,362,133 | * 12/1982 | Malik | 477/99 |
| 4,371,051 | * 2/1983 | Achterholt | 477/111 |
| 4,405,031 | * 9/1983 | Rotter | 477/6 |
| 4,630,577 | * 12/1986 | Cornacchia | 477/186 |
| 6,135,920 | * 10/2000 | Kamiya et al. | 477/185 |

FOREIGN PATENT DOCUMENTS

| | | |
|---|---|---|
| 33 13 038 | 10/1984 | (DE) . |
| 33 23 563 | 1/1985 | (DE) . |
| 38 32 567 | 3/1990 | (DE) . |
| 44 27 203 | 2/1995 | (DE) . |
| 44 33 893 | 4/1995 | (DE) . |
| 195 46 549 | 3/1997 | (DE) . |
| 196 19 320 | 4/1997 | (DE) . |
| 0 647 775 | 4/1995 | (EP) . |

* cited by examiner

Primary Examiner—Sherry Estremsky
(74) Attorney, Agent, or Firm—Crowell & Moring, L.L.P.

(57) ABSTRACT

A method shuts down and switches on cylinders in a motor vehicle internal-combustion engine. Injection valves are controlled by an engine timing system as a function of vehicle operating conditions. The shutting-down of cylinders is carried out sequentially according to a defined program. Vehicle brakes can be acted upon in a power-operated manner. In order to prevent a switching jolt when shut-down cylinders are switched on again, when the cylinders are switched on again, the running up of the engine takes place in steps according to another defined program and a braking intervention is carried out.

16 Claims, 3 Drawing Sheets

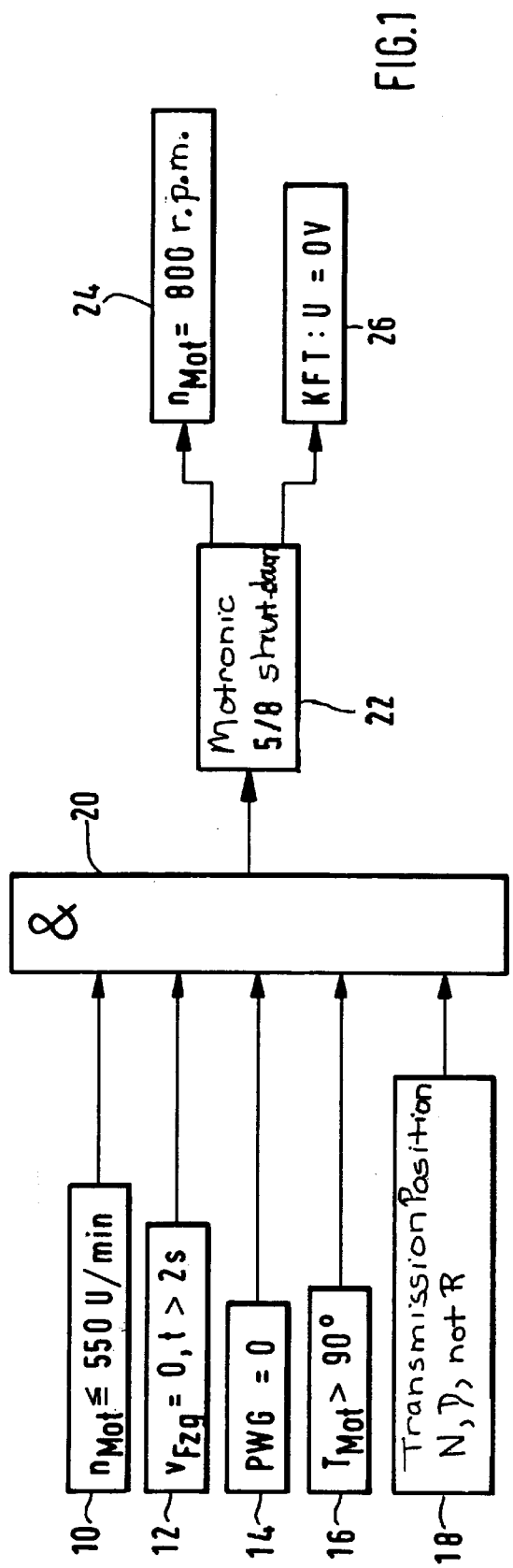
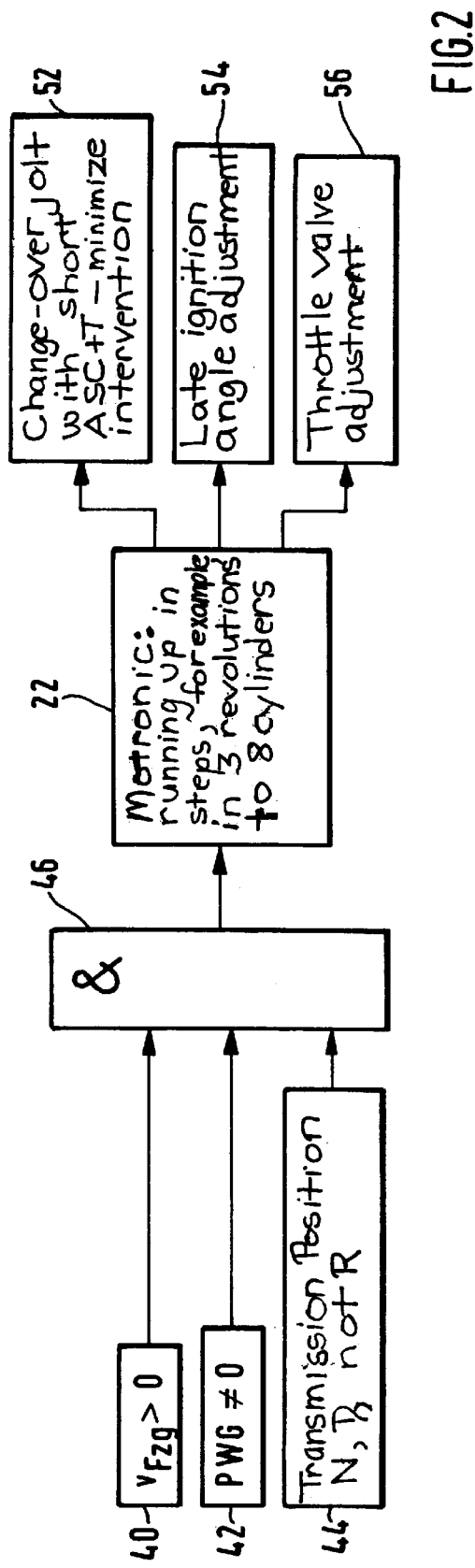

| | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
|---|---|---|---|---|---|---|---|---|---|---|---|---|---|---|---|---|---|---|---|---|---|---|---|---|
| 1 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
| 2 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 |
| 3 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 |
| 4 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 |
| 5 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 |
| 6 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 |
| 7 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 |
| 8 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 |

FIG. 3a

| | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
|---|---|---|---|---|---|---|---|---|---|---|---|---|---|---|---|---|---|---|---|---|---|---|---|---|
| 1 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
| 2 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 |
| 3 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 |
| 4 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 |
| 5 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 |
| 6 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 |
| 7 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 |
| 8 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 |

FIG. 3b

|   | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
|---|---|----|-----|-----|-----|-----|-----|-----|---|----|-----|-----|-----|-----|-----|-----|---|----|-----|-----|-----|-----|-----|-----|
| 1 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 |
| 2 | 90 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 |
| 3 | 180 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 |
| 4 | 270 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 |
| 5 | 360 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 |
| 6 | 450 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 |
| 7 | 540 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 |
| 8 | 630 | 0 | 90 | 180 | 270 | 360 | 450 | 540 | 630 | 0 | 90 | 180 | 270 | 360 | 450 | 540 | 630 | 0 | 90 | 180 | 270 | 360 | 450 | 540 |

FIG.3c

METHOD FOR SHUTTING DOWN AND SWITCHING ON MOTOR VEHICLE INTERNAL-COMBUSTION ENGINE CYLINDERS

BACKGROUND AND SUMMARY OF THE INVENTION

This application claims the priority of German application 199 07 851.3, filed in Germany on Feb. 24, 1999, the disclosure of which is expressly incorporated by reference herein.

The invention relates to a method for shutting down and switching on cylinders of a motor vehicle internal-combustion engine in which the injection valves are controlled by an engine timing system as a function of vehicle operating conditions. The shutting-down of the cylinders is carried out sequentially according to a defined program. The vehicle brakes can be acted upon in a power-operated manner.

Because of stricter emissions laws and the goal of reducing consumption, the principle of shutting down cylinders of an engine is used more and more frequently.

In general, there are two different methods of shutting down cylinders. On the one hand, there is the mechanical, or better, electromechanical shut-down. This operates to shut down cylinders by shutting down the charge cycle valves and switching off the injection valves. This method offers the largest potential with respect to saving fuel. The advantages of the electromechanical shutting-down of cylinders are: (1) low charge cycle losses, (2) low friction losses by the partial shutting-down of the valve gear, (3) low throttling losses, and (4) a better charging of the active cylinders. The disadvantages are: (1) the necessity of a mechanical change at the cylinder head and at the valve gear, (2) the use of an additional electronic control, and (3) the susceptibility of mechanical components, as well as the additional costs and the additional weight of such mechanical components.

A lower-cost implementation for shutting-down of the cylinders involves a purely electronic shutting-down, specifically the shutting-down of the injection valves. Although, in contrast to the mechanical and/or electromechanical shut-down, this method results in a lower reduction of fuel consumption, it is significantly simpler with respect to the expenditures. This is because no mechanical changes must be carried out at the cylinder head and at the valve gear. Only modifications on an already existing control unit are required.

The present shut-down method is one such purely electronic method of shutting-down the cylinders. Concerning the related field of the invention, reference is made to German Patent document DE 196 19 320 A1, German Patent document DE 44 27 203 C1, European Patent document EP 0 647 775 A2 and German Patent document DE 33 13 038 C2.

German Patent document DE 196 19 320 A1 describes a system for shutting down a fixedly defined number of cylinders by stopping the fuel supply. Here, the number of the shut-down cylinders can be changed. For setting the driving comfort, at least one of the ignition angle, the volumetric efficiency and the injection are adjusted. A decision concerning the shut-down takes place as the result of the engine load and the rotational engine speed.

German Patent Document DE 44 27 203 C2 also describes a method of disconnecting individual cylinders by stopping the fuel supply. As a function of a momentary engine load, the process decides whether or not the cylinder following in the ignition order is fired. However, the object of this method is not the saving of fuel, but rather a wheel slip control permitted by this method.

German Patent document DE 33 13 038 C2 describes a method of shutting-down cylinder groups by shutting down the fuel supply and by switching from one cylinder group to another cylinder group in order to avoid a cooling of the shut-down cylinders in view of possible disadvantages in the pollutant emissions. In this case, control takes place by way of the ignition angle and the volumetric efficiency, as well as the air quantity. In addition, the change-over operation is carried out during a certain number of engine revolutions so that, if possible, the driver does not notice any change-over jolt.

A method of the above-mentioned type is described in European Patent document EP 0 647 775 A2, in which a sequential shutting-down of the injection according to a defined program is described for controlling the coolant temperature when idling. A sequential shut-down takes place only if the coolant temperature is higher than 80° C. and/or the air temperature in the intake air collector is higher than 20° C. The alternating shutdown is eliminated only at approximately 5 km/h and is effective only when idling. By means of this method, it is possible to prevent the cylinders from cooling and falling below a defined limit temperature in the case of the catalyst.

The object of the present invention is to further develop a method of the above-mentioned type, in which a change-over jolt is avoided when cylinders are switched on. This object is achieved by a method for shutting down and switching on cylinders in a motor vehicle internal-combustion engine in which the injection valves are controlled by an engine timing system as a function of vehicle operating conditions. The shutting-down of the cylinders is carried out sequentially according to a defined program. The vehicle brakes can be acted upon in a power-operated manner. When cylinders are switched-on, the running-up of the engine takes place in steps according to another defined program, and a braking intervention is carried out for avoiding the change-over jolt.

Accordingly, in the case of a method according to the invention, the engine run-up is carried out in steps according to a defined program. In addition, a braking intervention takes place by power-assisted brakes for avoiding the change-over jolt.

Because of the corresponding control of the injection valves, the purely electronic cylinder shut-down does not offer the maximally possible saving of fuel. However, it can be carried out by means of minimal technical expenditures. The advantages of this method are low throttling losses, a better charging of the active cylinders, and an implementation at reasonable cost. By means of the above-mentioned method, an interconnected overall concept is introduced for the comfort-oriented shutting-down and switching-on of cylinders. In particular, if possible, the driver should not notice the reduction of the operated cylinder or the switching-on of the shut-down cylinders.

Additional measures for avoiding a change-over jolt may include an ignition angle adjustment and a throttle valve adjustment, which are preferably caused by the engine timing system.

A so-called ⅝ shut-down was found to be a suitable shutting-down method in the case of eight-cylinder engines, in which case, in a selective manner, 5 of the 8 cylinders are not operated during two crankshaft revolutions.

Nevertheless, over a defined crankshaft angle range, all cylinders are ignited exactly once. More precisely, ignition no longer takes place at every 90° crankshaft angle, but rather at every 270°. The ignition interval as well as the firing of the cylinders to be ignited is correspondingly changed (compare FIG. 3a with FIG. 3b). FIG. 3a shows a normal firing of the cylinder during operation of all cylinders in an 8-cylinder engine.

In the case of an engine with a different number of cylinders, a different number of cylinders can naturally be shut down per two crankshaft revolutions.

In a simple embodiment of the invention, cylinder shut-down takes place only when the vehicle is standing and idling. Although this does not result in a optimal saving of fuel, the momentary jolt problems are reduced.

In another preferred embodiment, cylinder shut-down takes place only when a defined coolant temperature threshold is exceeded. Furthermore, it can be recorded in a defined program that all cylinders of an engine are operated again at least starting from a defined vehicle speed limit.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram illustrating the prerequisites for the shut-down operation according to the invention;

FIG. 2 is a block diagram illustrating the prerequisites for a switch-on operation of cylinders according to the invention;

FIG. 3a is a table of an ignition sequence for an 8-cylinder engine with full cylinder operation;

FIG. 3b is a table indicating the ignition sequence for an 8-cylinder engine with a ⅝th shut-down; and FIG. 3c is a table indicating the ignition sequence for a transition from a ⅝th shut-down to full operation of the cylinders during two revolutions.

DETAILED DESCRIPTION OF THE DRAWINGS

The basic idea of the present invention is to avoid a change-over jolt when shut-down engine cylinders are switched on again. The present invention is described with reference to an 8-cylinder engine (not shown) having direct injection valves. The valves are controlled by a digital engine electronic system. The present invention is, of course, applicable to other engines having different configurations. In this case, in this simple embodiment, the cylinder shut-down takes place only during idling because then the expenditures for avoiding a change-over jolt can be controlled best.

During normal full operation (operation of all eight cylinders), an ignition sequence exists. This sequence is illustrated in FIG. 3a (compare bold zero figures); that is, at every 90° crankshaft angle, one cylinder is ignited with the ignition sequence 1-5-4-8-6-3-7-2. Thus, at every 720°—this corresponds to 2 revolutions of the crankshaft—each cylinder is ignited exactly once.

If it is now determined according to FIG. 1 that (1) the rotational idling speed of the engine $n_{mot}$ is lower than or equal to 550 revolutions per minute (reference number 10), (2) the driving speed $v_{Fzg}$ is equal to zero (reference number 12), specifically for a time period of more than 2 seconds, (3) the vehicle brake is operated (PWG=0) (reference number 12), (4) the engine temperature $T_{Mot}$ is higher than 90° (reference number 16), and (5) the automatic transmission is in a transmission position neutral (N) or normal driving operation (D), then a logic AND gate 20, into which this information signal is fed, emits a corresponding information to an engine timing system (Motronic—reference number 22). With respect to the position of the gear selection lever, it is pointed out that this gear selection lever should not be in the reverse position (R) (reference number 18).

If the engine timing system 22 receives a corresponding signal from the AND gate 20, it initiates a ⅝th shut-down of the cylinders so that the injection valves and the ignition are operated such that an ignition sequence takes place as illustrated in FIG. 3b (compare bold zero figures). In the case of this so-called ⅝th shut-down, the ignition of one cylinder takes place at every 270° of crankshaft revolution, specifically in the ignition sequence 1-8-7-5-6-2-4-3, so that after 2160° corresponding to 6 complete revolutions of the crankshaft—, all cylinders are ignited once. By means of the ⅝th shut-down, individual cylinder cooling is avoided. This has an advantageous effect on the emissions behavior of an engine operated in this manner.

According to FIG. 1, after the ⅝th shut-down, the rotational idling speed of the engine $n_{Mot}$ is raised to 800 revolutions per minute (reference number 24). Furthermore, the voltage of an electrically heatable thermostat (KFT=characteristic diagram thermostat) is set to 0 volt. This prevents cooling of the engine as the result of the reduced number of fired cylinders. Raising the idling speed additionally ensures a clean concentric running of the engine, particularly in the case of loaded secondary assemblies. All above-mentioned parameters can be stored individually or combined as a characteristic diagram.

In the case of the above-mentioned cylinder shut-down, it must be taken into account that the shut-down cylinders are filled with fresh air, which influences the mixture formation ($\lambda \gg 1$). Although, during shut-down, fuel injection can be controlled from a characteristic diagram, various engine data, such as the intake air quantity, the intake air temperature, the rotational speed and the engine temperature must be stored in this characteristic diagram in order to ensure a corresponding mixture preparation. During the exhaust gas after treatment, the conversion rate of the three-way catalyst falls because of the air excess in the exhaust gas, so that only a portion of the nitrogen oxides can still be converted. For solving this problem, for example, a DeNOx catalyst system, must be used.

The switching-on of shut-down cylinders is particularly critical. The resulting power jump should be as pleasant as possible for the driver and, for safety reasons, must not take place abruptly.

In the present case, the switching-on of the cylinders takes place at a vehicle speed $v_{Fzg}$ which is greater than zero (reference number 40), and under the conditions wherein (1) the vehicle brake is not operated (PWG unequal to zero) (reference number 42), and (2) the selector lever position of the transmission at neutral (N) or in the driving position (D).

The above-mentioned signals supplied by sensors are processed by the AND gate 20. When all above-mentioned conditions are met, the AND gate 20 emits a signal to the engine timing system 22 which, according to a defined program, causes a running-up (for example, within three revolutions). A running-up in two revolutions is illustrated in FIG. 3c; within the first 720°, the ⅝th shut-down is still in effect. Within the next 720° of the FIG. 3c crankshaft revolution, a continuous running-up takes place with the ignition sequence 1-4-6-7 with an ignition angle difference of 180° respectively. The last 720° of crank angle in FIG. 3c then again show normal 8-cylinder operation. In this case, the respective ignitions are marked by bold zeros.

Simultaneously with the switching-on of the cylinders, just enough intervention of the power brakes is caused for compensating the change-over jolt generated by the switching on such that the power increase caused by the switching-on of the cylinders is compensated. In this case, the Motronic emits an information signal to the brake control system, corresponding to the switching-on of the cylinders, and, in the present case, to the control for the "ASC+T" intervention (wheel slip control). The power brake intervention and the wheel slip drive will not be discussed here in detail as it is well known in the state of the art.

In addition, a late ignition angle adjustment takes place for further reducing the switching jolt by the power jump (reference number 54) generated by the switching-on of the cylinders. Finally, the engine timing system 22 also carries out a throttle valve adjustment according to reference number 56. Naturally, all measures for reducing the change-over jolt must be coordinated with one another. Preferably, the data for controlling the braking intervention, the ignition angle adjustment and the throttle valve adjustment are taken from a characteristic diagram which contains the corresponding information as a function of vehicle operating conditions, such as the rotational engine speed, the vehicle speed, etc.

All measures caused by the engine timing system 22 contribute to the fact that a switching jolt, when starting from idling, is avoided as completely as possible. The driver will then not notice a change-over from a partially operated engine to a completely operated engine.

Naturally, it is also possible to indicate a method in the case of which the change-over is carried out at partial load. In every case—as in the present method—care must be taken that the power jump is compensated during a switching-on of the cylinders.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating cylinders of a motor vehicle internal-combustion engine to avoid change-over jolts, the method comprising the acts of:
   sequentially shutting down the cylinders according to a defined program; and
   when switching-on the cylinders, further comprising the acts of:
      running-up the engine to switch on the cylinders according to another defined program; and
      performing a braking intervention of the vehicle to avoid the change-over jolt during the running-up act.

2. Method according to claim 1, further comprising the act of:
   adjusting an ignition angle to avoid the change-over jolt.

3. Method according to claim 2, further comprising the act of:
   adjusting a throttle valve to avoid the change-over jolt.

4. Method according to claim 2, wherein during the cylinder shut-down, along a defined angle range of a crankshaft, all cylinders are fired precisely once.

5. Method according to claim 1, further comprising the act of:
   adjusting a throttle valve to avoid the change-over jolt.

6. Method according to claim 5, wherein during the cylinder shut-down, along a defined angle range of a crankshaft, all cylinders are fired precisely once.

7. Method according to claim 1, wherein during the cylinder shut-down, along a defined angle range of a crankshaft, all cylinders are fired precisely once.

8. Method according to claim 1, wherein the cylinder shut-down takes place only in the case of a standing and idling vehicle.

9. Method according to claim 1, wherein the cylinder shut-down is carried out only above a certain defined coolant temperature threshold.

10. Method according to claim 1, wherein, above a defined driving speed limit, the engine of the vehicle is operated by using all cylinders.

11. A software product, comprising:
    a computer readable medium having stored thereon program code segments that:
       sequentially shuts down the cylinders according to a defined program; and
       when switching-on the cylinders runs-up the engine to switch on the cylinders according to another defined program; and
       signals a braking intervention of the vehicle to avoid the change-over jolt during the running-up act.

12. Product according to claim 11, further comprising a program code segment that:
    controls an adjustment of an ignition angle to avoid the change-over jolt.

13. Product according to claim 11, further comprising a program code segment that:
    controls an adjustment of a throttle valve to avoid the change-over jolt.

14. Product according to claim 11, wherein during the cylinder shut-down, along a defined angle range of a crankshaft, a program code segment signals all cylinders to be fired precisely once.

15. Product according to claim 11, wherein the cylinder shut-down takes place only in the case of a standing and idling vehicle.

16. Product according to claim 11, wherein the cylinder shut-down is carried out only above a certain defined coolant temperature threshold.

* * * * *